June 20, 1961 F. O. BOHN 2,989,631
TRACER INJECTOR AND DETECTOR
Filed July 23, 1958 3 Sheets-Sheet 2

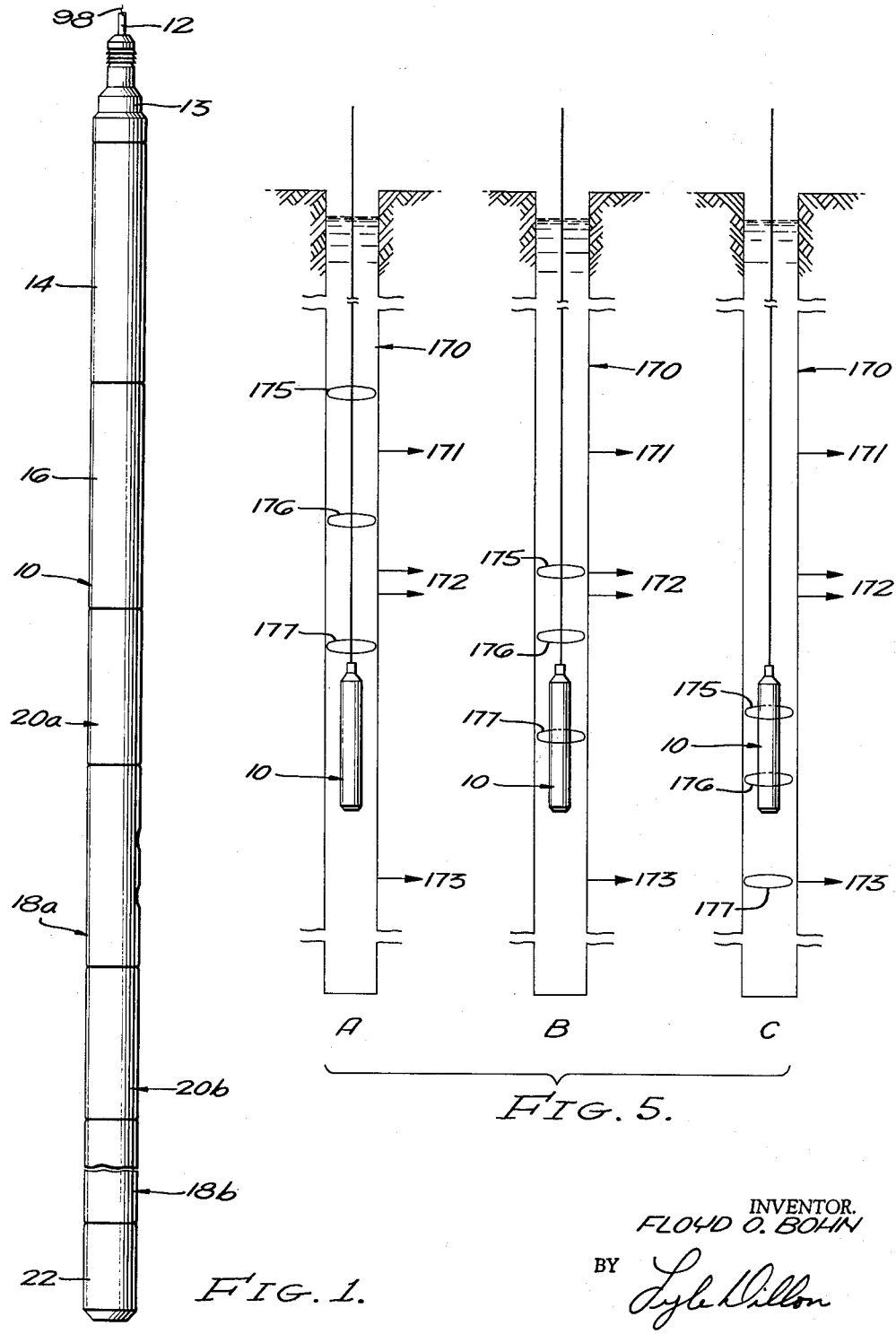

INVENTOR.
FLOYD O. BOHN
BY Lyle Dillon
ATTORNEY

June 20, 1961

F. O. BOHN 2,989,631

TRACER INJECTOR AND DETECTOR

Filed July 23, 1958

INVENTOR.
FLOYD O. BOHN
BY
Lyle Dillon
ATTORNEY

United States Patent Office 2,989,631
Patented June 20, 1961

2,989,631
TRACER INJECTOR AND DETECTOR
Floyd O. Bohn, La Habra, Calif., assignor to Lane-Wells Company, a Division of Dresser Industries, Inc., Houston, Tex., a corporation of Delaware
Filed July 23, 1958, Ser. No. 750,434
1 Claim. (Cl. 250—43.5)

This invention relates in general to a method and apparatus for subsurface exploration of the earth, and more particularly to a method and apparatus for investigating the flow of fluid within earth boreholes and into and out of subsurface formations penetrated by earth boreholes.

It has previously been proposed to investigate the flow of fluids within a borehole by placing a relatively small quantity or charge of a radioactive substance in the borehole and thereafter sensing the movement of the radioactive substance as it is carried by movement of fluids in the borehole. One method of performing an operation of this type has been to introduce radioactive material through tubing into a borehole and allow the gas or liquid in the borehole to carry the radioactive material from the point of such introduction to locations which can be later determined. If the point of escape of fluids from a borehole into penetrated formations is to be investigated, the radioactive material used may be such as will deposit or be filtered out upon the walls of the borehole at escape locations. A radioactivity detector is subsequently employed to locate such deposited radioactive material and thereby indicate such locations of escape of fluid from the borehole.

Injection of such a quantity or charge of tracer material into a borehole at the earth's surface results in considerable dilution and diffusion thereof as it travels down the hole to the penetrated formation of interest. As a result, detection of locations at which such tracer material is thus deposited, as heretofore practiced, may be difficult and time-consuming.

Another method of investigating the flow of fluid in the borehole involves the use of a dump bailer or other similar device to place a quantity of the tracer material in the borehole in vicinity of the formation of interest. For example, the dump bailer may carry a quantity of radioactive material to the bottom of the borehole and upon striking the bottom be triggered to effect its release. Apparatus of this type may fail to provide a concentrated charge or body of radioactive material at a desired location because the material may spill or be washed out of the bailer or be displaced by turbulence in the fluid in the borehole resulting from movement of the bailer. Furthermore, only one quantity or charge of radioactive material may thus be placed in the borehole for each trip into the borehole by such apparatus.

The above-described method of placing radioactive tracer material in a borehole also necessitates a considerable delay between the time the material is released at the chosen location therein and the time when it may be located. That is, the material may be deposited on the wall of a borehole a short time after it is released from a dump bailer or the like device and this time may be considerably less than that which is required to remove the dump bailer and run a detector into the hole to the required location. Therefore, under such conditions, no opportunity is had to observe either the direction or rate of movement of the charge of radioactive material within the fluid in the borehole, and the radioactive material may even be considerably dissipated before it can be located. Thus, there exists a need for an improved method and apparatus for investigating the flow of fluid in a borehole.

The present invention in its more general form provides a method and apparatus for investigating the flow of fluid in a borehole by injecting a plurality of discrete quantities or charges of radioactive material into the fluid within the borehole, and immediately sensing the movement and location of the charges as they are carried by fluid flowing in the hole. The apparatus of the present invention for investigating such fluid flow incorporates means for selectively injecting a plurality of separate discrete quantities or charges of radioactive material, either in liquid or finely divided solid form, at selected depths within a borehole, in conjunction with a radioactivity-detector apparatus. Furthermore, a novel structure is provided in the dispensing device for the ejecting of such charges of radioactive material.

It is accordingly an object of this invention to provide an improved method and apparatus for investigating the flow of fluids.

It is another object of this invention to provide an improved instrument for placing charges of radioactive material in a borehole, and determining the position such charges take therein after they are subjected to fluid movement.

It is a still further object of this invention to provide an apparatus to selectively inject a plurality of charges of radioactive material at desired locations in a borehole.

It is a further object of this invention to provide an apparatus for injecting a charge of radioactive material at a selected location in a borehole and promptly thereafter ascertaining movement of the charge.

It is a still further object of this invention to provide an apparatus for selectively injecting a plurality of charges of radioactive material in a borehole and determining movements of the charges promptly after they are injected.

Still a further object of the present invention is to provide an apparatus for investigating the flow of fluid past a predetermined location in a borehole.

One further object of this invention is to provide a method of investigating the flow of fluid in a borehole wherein the movement of a plurality of charges of radioactive material is employed to indicate fluid flow.

Other objects, advantages and features of novelty of this invention will be evident hereinafter.

In the drawings which illustrate a preferred embodiment of the invention

FIGURE 1 is an elevational view of the general assembly of an instrument constructed in accordance with the principles of the present invention;

FIGURE 5 is a diagrammatic representation illustrating a method of investigating fluid flow in accordance with the principles of the present invention.

Figure 2A:
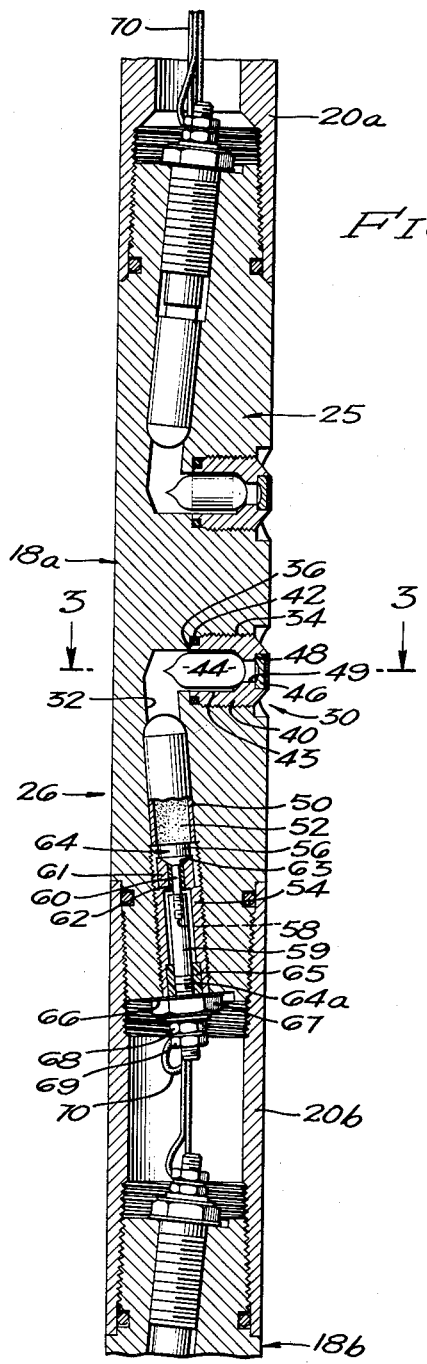
FIGURES 2A and 2B are enlarged fragmentary vertical sectional views of portions of the apparatus shown in FIGURE 1.

Referring first to FIGURE 1, an elongated cylindrical instrument assembly 10 comprises the down-hole portion of the described embodiment of the present invention. A supporting conductor cable 12 is attached at the upper end of the instrument assembly 10 through a conventional cable head 13 and is adapted to be payed out and reeled in by conventional, surface hoist apparatus (not shown) to vary the depth of the instrument 10 in a borehole. The instrument assembly 10 is divided into a number of coaxially-joined sections or housings each of which contains a particular component of the complete down-hole apparatus. The uppermost section 14 of the instrument contains a radioactivity detector for sensing radiation to form an indicative electrical signal, as hereinafter more fully described. A section 16, coupled to the lower end of section 14, contains switching apparatus for selectively operating ejector devices to discharge radioactive material as hereinafter more fully described. Section 16 is coupled at its lower end to a tracer gun section 18a by an intermediate coupling 20a, and section 18a is in turn coupled at its lower end to a tracer gun section 18b by an intermediate coupling 20b. The tracer ejector gun sections 18a and 18b may be of identical construction, as herein shown, and each contains means for containing and ejecting quantities of radioactive tracer material, as shown in detail in FIGURE 2A. Any desired number of such tracer ejector sections such as shown at 18a and 18b may be thus coupled end to end to provide, in operation, any desired number of tracer ejections. The final, lowermost one of the tracer ejector sections threadably engages an end plug section 22 which terminates the instrument as shown in detail in FIGURE 2B.

In general, fluid flow within a borehole may be investigated by lowering the instrument 10 to a predetermined location in the borehole. At the desired location of the instrument 10 within the borehole electrical signals are transmitted from the surface through the cable 12 to cause separate charges of radioactive material to be selectively discharged from the ejecting means contained in the beforementioned sections 18a and 18b of the instrument. Of course, individual charges may then be ejected at different locations and at different times in the borehole. After any desired number of charges of radioactive material have been ejected in the borehole, the detector in section 14 of the instrument 10 is employed to determine the movement or point of deposition of the charges and thereby indicate the pattern of fluid movement within the borehole. Movements of the charges of radioactive material ejected into the borehole may be ascertained either by moving the instrument 10 relative to the charges or by maintaining the instrument 10 stationary and allowing the fluids in the hole to move the charges relative to the instrument, or both, depending upon conditions within the borehole and measuring or recording the effect of such movement at the top of the borehole, as more fully described hereinafter.

Figure 2B:
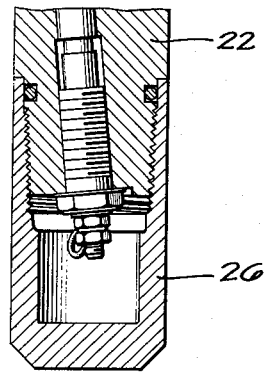
Figure 3:
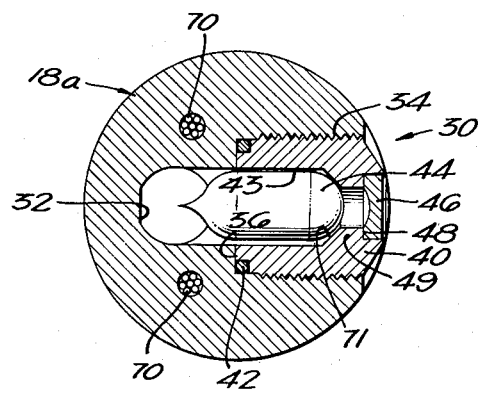
FIGURE 3 is a cross-sectional view taken on line 3—3 of FIGURE 2A.

Reference will now be had to FIGURE 2A for a more detailed consideration of the ejector devices in sections 18a and 18b of the instrument 10.

Each such ejector section contains two identical, longitudinally-spaced, oppositely-positioned ejector gun devices as shown generally at 25 and 26, and because the ejector gun sections and ejector devices are identical, only one such gun ejector device, 26, will be hereafter described in detail.

The section 18a, as shown in FIGURE 2A, contains a laterally-directed socket 30 which intersects a generally L-shaped inner chamber 32. The diameter of the inner chamber 32 is smaller than that of socket 30 whereby an annular, forwardly-facing shoulder 36 is formed at the junction thereof. The socket 31 is internally threaded, as shown at 34, to receive an externally threaded gun barrel body 40. An O-ring 42 is sealingly interposed between the rear end of the gun barrel body and the shoulder 36. The gun barrel body 40 is formed with a coaxial bore 43 of varying internal diameter with the front end portion of reduced internal diameter as shown at 49 being closed adjacent the outer end by a fluid-tight, press-fitted seal disc 46.

The seal disc 46 abuts the forwardly-facing shoulder 48 formed by the reduced bore portion 49. A capsule 44 containing the radioactive tracer material to be discharged from the device is supported within the rearward portion of the bore 43 of the gun barrel body 40. The capsule 44 is preferably formed of a relatively thin frangible material such as glass or plastic. Various kinds of radioactive tracer materials, preferably radioisotopes may be employed in the capsule, such as for example, iodine 131 or iridium 192, in solution in oil or water, or particle type tracers generally comprising finely divided solids carrying adsorbed or plated coatings of radioactive materials such as gold 198 as is now well known in the art. A capsule content of such tracer material of approximately 1 mc. (millicurie) is generally suitable.

The inner chamber 32 extends generally longitudinally from the socket 30 and initially contains a cartridge consisting of a shell 50 filled with a combustible or explosive propellant 52. When the propellant 52 is ignited the pressure formed in the inner chamber breaks capsule 44 and blows out or ruptures the disc 46, thereby discharging or ejecting the radioactive tracer material from the device into the fluid in the borehole surrounding the instrument assembly.

The means for igniting the explosive propellant 52 of each cartridge 50 of the apparatus assembly is identical and is also shown in detail in FIGURE 2A. The lower portion of the inner chamber 32 is internally threaded to receive an externally threaded breech plug 54. The upper end portion of the breech plug 54 is formed with a neck 61 of reduced external diameter terminating in an inwardly-converging conical seat 63 and the lower end terminates in a hexagonal head 67. The central bore of the neck 61 is provided with a tubular insulating insert 62. Extending upwardly from the end of the neck 61 of the breech plug 54 and seated in the conical seat 63 is an igniter device 64 having a generally cylindrical head 56 and a bottom portion fitting said seat 63. A stem 60 extends from the bottom of the head 56, the lower end portion of which is threaded as shown in dotted lines at 58 into the upper end of a shank 59 of increased diameter. The lower end of the shank 59 is formed with an externally threaded portion 64a which extends out through the lower end of the breech plug and into the space within the coupling 24 so as to receive a retaining nut 68. Insulating bushing 65 surrounding the lower end portion of the shank 59 and an insulating washer 66 under the hex head 67 of the breech plug 54 serves to centralize the shank 59 within and insulate it from the surrounding breech plug 54. Nut 69 threaded onto the lower end portion of the shank 58 below the retaining nut 68 serves to hold between them the terminal end of an electrical conductor 70.

The propellant 52 of the cartridge 50 is ignited when an electric current passes through the conductor 70 to the igniter, as hereinafter described. Various igniters suitable for igniting explosive devices of the kind herein disclosed are well known in the prior art. For a more detailed description of an igniter having a general construction satisfactory for use in the present invention reference may be had to United States patent to Phillips No. 2,649,736.

To prepare the discharge device for operation the gun barrel body 40 is removed from socket 30 and a seal disc 46 is forced into the front end of bore 43 of the gun barrel body 40 until it engages the shoulder 48. A capsule 44 containing a selected tracer material is then placed in the bore 43 or the gun barrel body 40 and the gunbarrel body is threaded into the socket. It is to be particularly noted that the front end of the capsule 44 abuts the generally frusto-conical rear surface 71 formed at the rear end of the reduced bore 49 so as to separate and space the capsule 44 from the disc 46. The disc 46 may, therefore, if desired, be tapped into place while the gun barrel body 40 is secured within the socket without breaking the capsule. A cartridge 50 then is placed within chamber 33, the coupling section 20b having been previously removed, after which the breech plug 54 and its attached parts is assembled therein, as shown in FIGURE 2A.

The plurality of tracer dispensing devices positioned in the several gun sections 18a and 18b of the instrument, as shown in FIGURE 1, are each connected by individual conductors as shown at 70 to a switching system contained in section 16 of the instrument. Any desired number of such sections as 18a and 18b may be coupled together in one assembly, but for convenience of illustration the number of such sections are here assumed to be four from which the number of tracer dispensing devices are thus assumed to be eight, requiring eight conductors such as shown at 70, each connected to a contact point of an eight point switch, as shown at 135 in FIGURE 4. The details of the switching system will be considered hereinafter.

Figure 4:
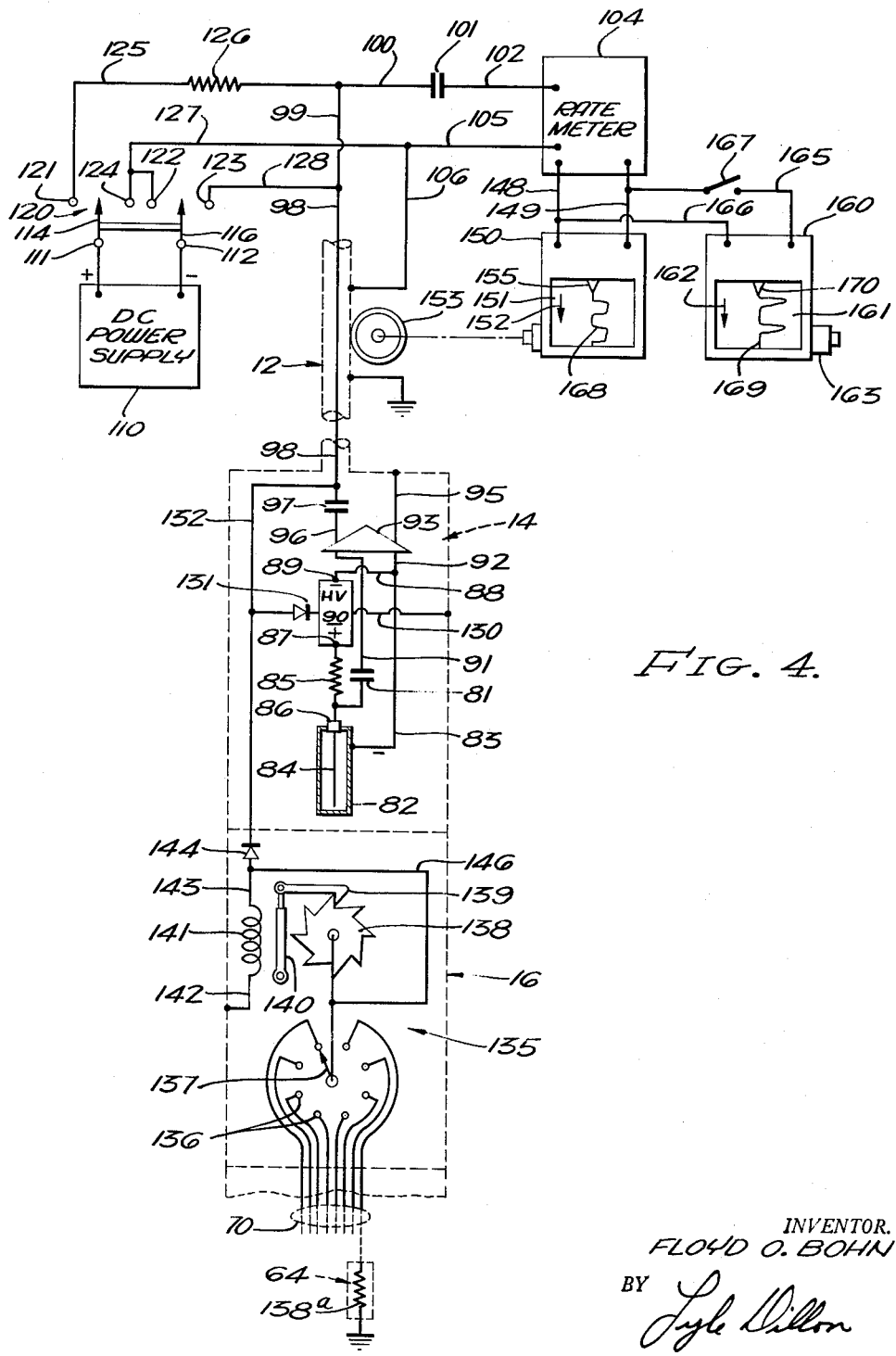
FIGURE 4 is a diagrammatic representation of an electrical measurement and control system employed in conjunction with the apparatus of the present invention.

Reference will now be had primarily to FIGURE 4 for a description of the surface current supply and recording apparatus and the sub-surface radioactivity detector and switching system.

Section 14 of the sub-surface instrument assembly 10 contains a Geiger counter which may be of conventional design including a gas-containing, cylindrical metal shell 82 and a central rod electrode 84 therein, the shell and rod electrode being electrically insulated from one another by an insulating bushing 86. The central electrode 84 of the Geiger counter is connected to the positive terminal 87 through resistor 85 and the shell 82 is connected by way of conductor 83, and conductor 88 to the negative terminal 89, respectively, of a high voltage D.C. supply 90. The voltage supplied by the supply 90, and other circuit constants are preferably such that the detector operates as a Geiger or pulse counter, as is well known in the art. The Geiger counter across which the counter signal pulsations appear, is connected by way of the capacitor 81 and conductors 91 and 92 to the input of an amplifier 93. One of the output terminals of the amplifier 93 is connected at 95 to ground and the other output terminal of the amplifier is connected through conductor 96 and capacitor 97 to the cable conductor 98 which extends through the suspending cable 12 to the earth's surface.

The cable conductor 98 makes connection at the surface, by way of conductors 99 and 100, capacitor 101 and conductor 102 to one input terminal of a rate meter 104. The other terminal of the rate meter makes connection through conductors 105 and 106 to ground and then through the cable sheath or ground to the beforementioned ground conductor connection 95, thus completing the circuit from the Geiger counter and amplifier 93 to the rate meter 104.

Located at the earth's surface is a main D.C. power supply 110, the positive and negative output terminals of which are connected to the pivot terminals 111 and 112 respectively, of the blades 114 and 116 of a double pole three position switch 120. Switch 120 is provided with four stationary contact points 121, 122, 123 and 124 so positioned that when the switch blades 114 and 116 are in a left-hand position they make contact with contact points 121 and 122 respectively, and when switch blades 114 and 116 are in the right-hand position they make contact with the contact points 124 and 123 respectively. Switch contact point 121 is connected through conductor 125, resistor 126 and conductor 99 to the beforementioned cable conductor 98. Switch contact point 122 is connected through conductor 127 to the beforementioned ground connection 106. Switch contactor point 123 is connected through conductor 128 to the beforementioned cable conductor 98.

Referring again to the subsurface portion of the equipment in sections 14 and 16 as shown in FIGURE 4, the high voltage D.C. supply 90 is provided with current input supply terminals, one of which is connected to ground through conductor 130 and the other of which is connected through a diode 131 and conductor 132 to the cable conductor 98.

Located within section 16 is an electromagnetically-actuated, stepping switch 135 having a plurality of stationary contact points as shown at 136 adapted to be sequentially contacted by a rotary switch arm 137. The switch arm 137 is adapted to be stepwise rotated from contact point to contact point by means of a ratchet wheel 138 which is in turn intermittently stepwise rotated by means of a pawl 139 connected to a movable armature 140 of an electromagnet having windings 141. The windings 141 of the electromagnet are connected at one end to ground through conductor 142 and at the other end through conductor 143 and diode 144 to the beforementioned conductor 132 which is in turn connected to the cable conductor 98. Electrical connection is also made through conductor 146 from conductor 143 to the switch shaft and thence to the switch arm 137 of the switch 135.

Each of the stationary contacts 136 of the switch 135 is connected through one of the several conductors, as shown at 70, each of which is in turn connected to the fusible igniter element 138a of the igniter device 64 of a tracer dispensing unit of the apparatus, as hereinbefore described.

The rate meter 104 comprises electronic apparatus, well known in the art, capable of receiving input pulses through the beforementioned input connections 102 and 105 and producing as a result thereof an output signal, preferably a D.C. signal, having a value or potential proportional to or having a given functional relation to the rate of occurrence of the input pulses. The output terminals of the rate meter are connected through conductor 148 and 149 to the input terminals of a suitable recording meter 150. The recording meter 150 comprises a chart 151 adapted to be moved in the direction of the arrow 152 by drive means including a pulley 153 which makes frictional driving engagement with the conductor cable 12 adjacent its point of entry into the earth borehole. The paper chart 151 is thus moved in correlation with the depth of the subsurface instrumentation assembly within the borehole. A pen 155 is moved laterally of the chart 151 in accordance with a function of or in proportion to the recorder input signal, to plot a graph such as illustrated at 168.

A second recorder, as shown at 160, may also be employed, which is similar to the beforementioned recorder 150 except that the chart 161 is adapted to be moved in the direction shown by the arrow 162 by suitable means such as clockwork 163 such that its movement is in proportion to time rather than in correlation with depth. Electrical connection from the rate meter to the recorder 160 is made by way of conductors 165 and 166 when the switch 167 is closed. The pen 170 of the recorder 160 is moved laterally relative to the chart 162 in accordance with a function of or proportional to the input signal thereto from the rate meter to plot a graph such as illustrated at 169.

The operation of the system shown in FIGURE 4 is as follows: The subsurface instrumentation including sections 14 and 16 are first lowered into the fluid-filled earth borehole to a desired depth and preferably, although not necessarily, during such lowering stage of the apparatus the switch 120 is maintained in the neutral or intermediate position illustrated in the drawing. Following this, when it is desired to discharge a quantity or charge of tracer material at the selected level within the borehole, the switch 120 is moved momentarily to its right-hand position, in which position electrical connection is made from the D.C. power supply 110 to the switching and firing mechanism within section 16 of the subsurface apparatus from the negative terminal of the power supply 110 through switch blade 116, contact 123, conductor 128, cable conductor 98, conductor 132, diode 144 (diode 131 being non-conductive at this polarity) and conductor 143 through the windings 141 of the electromagnet and thence through conductor 142 to ground, and return through ground or the cable sheath, through conductors 106 and 127 to switch contact 124, switch blade 114, and finally to the positive terminal of the power supply 110. Upon thus energizing the electromagnet 141 the ratchet wheel 138 is caused to rotate by the pawl 139 actuated by the armature 140 one step counterclockwise, which in turn rotates the stepwise switch 135 to bring the switch arm 137 into contact with one of the stationary contacts 136. Electrical connection is thus completed from the supply through conductor 146, switch arm 137 and one of the contact points 136, thence through one of the conductors 70 to the corresponding igniter element 138a of the igniter device 64 of one of the several tracer dispensing units, such as shown at 26 in FIGURE 2A. The resulting ignition of the propellent 52 dislodges the seal disc 46, breaks the capsule 44 and ejects the tracer material therefrom into the fluid in the annular space in the borehole surrounding the instrument assembly housing. By repeated movements of the switch 120 from the neutral position to the right-hand position the stepwise switch 135 is caused to move step by step, thereby sequentially making electrical connection with each of the several conductors 70 leading to the corresponding several igniters of the tracer ejecting devices.

When it is desired to actuate the radioactivity detector portion of the apparatus the switch 120 is moved from the neutral position shown in FIGURE 4 to its left-hand position, in which position contact is made between switch blades 114 and 116 and the stationary contact points 121 and 122 respectively. In this left-hand position of the switch 120 electrical connection is completed from the power supply 110, from the negative output terminal thereof, through switch blade 116, contact point 122 and conductors 127 and 106 to ground; thence through the ground or cable sheath to conductor 130 which makes connection with one of the current input terminals of the high voltage supply 90. From the other input terminal of the high voltage supply 90 the circuit is completed by way of diode 131 (diode 144 being nonconductive at this polarity) and conductors 132, cable conductor 98, conductor 99, resistor 126, conductor 125, stationary switch contact point 121 and switch blade 114 to the positive terminal of the beforementioned power supply 110. With the switch 120 in the left-hand position, as before described, the high voltage supply 90 is energized and in turn Geiger counter 80 is energized. Each Geiger counter pulse produces a corresponding voltage pulse which in turn is applied to the input of the amplifier 93. The resulting amplified output pulsations are applied between ground through conductor 95 and the cable conductor 98 through the capacitance 97. These amplified signal pulses are picked up at the earth's surface between the ground connection 106 and conductor 99 and applied to the input of the rate meter 104 by way of conductor 100, capacitance 101, conductor 102 and conductor 105. The resultant signals are recorded by the recording meters 150 or 160 to produce a graph as shown at 168 representing a measure of the detected radioactivity as manifested by the counter pulsation rate in correlation to instrument depth within the borehole and by a graph as shown at 169 representing such detected radioactivity at the detection point of the instrument within the borehole relative to time.

It may, therefore, be seen that the instrument as shown and described herein may be employed to eject a plurality of separate discrete charges of tracer material selectively at desired times and at desired depths within a borehole, and substantially simultaneously to plot the presence and location of such tracer material either with respect to the position of the instrument in a borehole or with respect to time. This system may be variously employed to indicate the flow of fluid in a subsurface chamber or borehole, as hereinafter more fully explained. For example, using the system for investigating the egress of fluids from a borehole involves lowering the instrument 10 to a location that is above suspected egress locations, i.e., locations of fluid entry or escape into a formation. With the instrument so positioned, one or a number of charges of finely divided solid or powdered radioactive material are ejected from the instrument. An interval of time is then permitted to pass during which the radioactive material moves with the fluid movement in the borehole to the locations at which the well fluids escape from the borehole and enters formations, resulting in the filtering out and deposition of the radioactive material on the borehole wall at such egress point. The instrument 10 is then lowered in the borehole with the radioactivity detector activated, and as the section 14 of instrument 10 passes locations at which radioactive material has been deposited, such locations are manifested by the recorder 150. It is to be noted that the amplitude of the graphical indications 168 recorded by the recorder 150 is thus indicative of the positions of the points of egress of borehole fluid with respect to depth. In using the system of the present invention as hereinbefore described, the attendant advantages are that several separate charges of radioactive material may be employed which are injected near the suspected point of egress of borehole fluid from the borehole to form, in the core 4 liquid tracers, strong deposits, which, being undiluted, can be sensed before dissipation occurs during an interval while a detector is placed in position. Furthermore, considerable time and effort is saved because the radioactivity detector is in the borehole ready to investigate the deposition of the radioactive material immediately after ejection.

Another method of using the system described above for investigating the flow of fluid in a borehole is, to place one or more discrete charges of radioactive material in the borehole by means of the ejecting devices hereinbefore described and thereafter to sense the rate of movement and changes in relative positions of such charges within the borehole. This method of investigation will now be considered in more detail with respect to FIGURE 5.

In FIGURE 5 there are shown representations of an uncased borehole 170 which penetrates formations that, for example, will receive or take fluid at locations 171, 172 and 173. It is assumed for the purpose of a general illustration that the flow rate of fluid passing or escaping into the formation at location 172 is substantially greater than the flow rate of fluid passing into the formation at points 171 and 173. To investigate and determine the flow of fluid into or out of the borehole 170 the system of the present invention may be employed to inject separate charges 175, 176 and 177 of radioactive material into the fluid in the borehole, at suitable longitudinal spacings relative to one another, and relative to the suspected points of fluid loss or egress from the borehole. For convenience of illustration these charges are shown as initially subtantially equally spaced apart. Such placing of the charges at the desired positions in the borehole may be accomplished by simply lowering the instrument 110 to measured depths and ejecting a charge of tracer at each such depth. Then, as fluid flows down through the borehole 170 as a result of the loss of fluid to the formation at locations 171, 172 and 173, the charges 175, 176 and 177 are carried or conveyed down through the borehole by the resultant movement of the fluid, the rate of movement of each such charge being dependent upon its position relative to the points of fluid loss from the borehole and the rate of such fluid loss. After a given interval of time the charges 175, 176 and 177 will have moved down the borehole, and will have moved closer together, as shown in FIGURE 5B, because of the fluid leaving the borehole at locations intermediate the original positions of the tracer charges, as shown in FIGURE 5A.

As the fluid in the well continues to flow downwardly, the charges 175, 176 and 177 remain in spaced relationship but move down-well, disposed as shown in FIGURE 5C until the lowermost charge 177 reaches the lowest point of fluid loss, 173. It is, therefore, apparent that by determining the relative position which the charges 175, 176 and 177 take after predetermined time intervals, as shown in FIGURES 5B and 5C, and with the borehole diameter known, certain indications are provided not only as to the points of loss but also rate of fluid loss from each of the points of fluid egress from the borehole.

The relative positions of the charges 175, 176 and 177 may be determined by the system of the present invention either by moving the instrument 10 through the borehole so as to pass the previously ejected charges of radioactive material, or alternatively by holding the instrument 10 stationary at a suitable position within the borehole and allowing the movement of the fluid in the borehole to carry the charges of radioactive material past the instrument 10, as illustrated in FIGURE 5. In the event that the former method of determination is employed, the recorder 150 is employed to record the radioactivity sensed by the detector in the instrument 10 in correlation with depth as the instrument is either lowered or raised in the borehole. When the moving instrument passes through the charges 175, 176 and 177, as shown in FIGURES 5B and 5C, indications are made by the recorder 150 manifesting the depths and relative positions of the charges.

In the event that the relative positions of the previously ejected charges of radioactive material are to be determined by maintaining the instrument 10 stationary, as beforementioned, the instrument is positioned ahead of and in the direction of movement of the charges 175, 176 and 177, as shown, by way of example, in FIGURE 5, to permit the fluid in the borehole to carry the charges past the instrument 10. During this interval, the recorder 160 is energized by closing the switch 167 so that the radioactivity charges sensed by the detector in the instrument 10 is plotted on a time base. The time base may be correlated to the rate of fluid movement through the borehole 170 so that the record made by the recorder 160 effectively constitutes a measure of the rate of loss of the fluid to the formation surrounding the borehole at the several points of interest.

Similar procedures may be employed to determine locations and rates of ingress or entrance of fluids in a borehole and both egress and ingress of such fluids.

It will, therefore, be seen that the present invention provides an instrument and method for investigating the character of flow of fluid in a borehole, not heretofore possible.

It is to be understood that the foregoing is illustrative only and that the invention is not to be limited thereby, but may include various modifications within the skill of the art without departing from the scope of the invention as defined in the appended claim.

I claim:

Apparatus for use in investigating the flow of fluids in boreholes comprising: a housing; a cable for lowering said housing into a borehole; a plurality of longitudinally-spaced openings in the side of said housing; a frangible fluid impervious capsule positioned within each of said openings; a predetermined quantity of radioactive material within each of said capsules; removable imperforate sealing means closing the outer end of each of said openings outwardly of the capsule therein; electrically actuated means within each of said openings for dislodging said sealing means, fracturing the capsules therein and expelling said radioactive material therefrom; radioactivity detector means carried by said housing; switching means for selectively applying electrical signals to selectively actuate each of the aforesaid dislodging and expelling means; and means for manifesting the radioactivity sensed by said detector means resulting from the expulsion of said radioactive material from said openings.

References Cited in the file of this patent
UNITED STATES PATENTS

| | | |
|---|---|---|
| 2,617,941 | Craggs | Nov. 11, 1952 |
| 2,805,346 | Piety | Sept. 3, 1957 |
| 2,813,980 | De Witte | Nov. 19, 1957 |
| 2,868,506 | Nestle | Jan. 13, 1959 |